(12) United States Patent
Hirabayashi

(10) Patent No.: US 11,296,567 B2
(45) Date of Patent: Apr. 5, 2022

(54) MOTOR HAVING CONCENTRATEDLY-WOUND STATOR COIL

(71) Applicant: DENSO CORPORATION, Kariya (JP)

(72) Inventor: Takashi Hirabayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 501 days.

(21) Appl. No.: 16/421,632

(22) Filed: May 24, 2019

(65) Prior Publication Data

US 2019/0280544 A1 Sep. 12, 2019

Related U.S. Application Data

(62) Division of application No. 15/260,741, filed on Sep. 9, 2016, now Pat. No. 10,355,548.

(51) Int. Cl.
  *H02K 3/18* (2006.01)
  *H02K 1/14* (2006.01)
  *H02K 3/52* (2006.01)

(52) U.S. Cl.
  CPC .............. *H02K 3/18* (2013.01); *H02K 1/148* (2013.01); *H02K 3/522* (2013.01)

(58) Field of Classification Search
  CPC ............ H02K 1/14; H02K 1/148; H02K 3/28; H02K 3/18; H02K 3/522
  USPC ................................................ 310/184, 198
  See application file for complete search history.

(56) References Cited

U.S. PATENT DOCUMENTS

| | | | |
|---|---|---|---|
| 6,356,005 B1 | 3/2002 | Hsu | |
| 8,519,590 B2 | 8/2013 | Baba | |
| 2009/0085422 A1* | 4/2009 | Kusawake | H02K 1/148 310/216.067 |
| 2010/0213784 A1* | 8/2010 | Iizuka | H02K 1/148 310/208 |

FOREIGN PATENT DOCUMENTS

| | | |
|---|---|---|
| JP | 2004-180396 A | 6/2004 |
| JP | 2008-092780 A | 4/2008 |
| JP | 2008-193861 A | 8/2008 |
| JP | 2012-175741 A | 9/2012 |
| JP | 2014-036478 A | 2/2014 |
| JP | 2018011426 A * | 1/2018 |

OTHER PUBLICATIONS

U.S. Appl. No. 15/260,741, filed Sep. 9, 2016 in the name of Takashi Hirabayashi.

* cited by examiner

*Primary Examiner* — Jeremy A Luks
(74) *Attorney, Agent, or Firm* — Oliff PLC

(57) ABSTRACT

A motor includes a stator that has pole cores and a stator coil comprised of unit coils each being concentratedly wound around a corresponding one of the pole cores. Each of the unit coils is comprised of first and second sub-coils that are stacked in two layers in a stacking direction. Each of the first and second sub-coils is spirally wound so that coil sides of the sub-coil overlap each other in an overlapping direction perpendicular to the stacking direction. Each of the unit coils also has, at a single place, a connecting portion that connects the first and second sub-coils of the unit coil. The connecting portion is provided in a coil end of the unit coil. For each of the first and second sub-coils of the unit coil, the connecting portion is located at an innermost periphery of the sub-coil in the overlapping direction of the sub-coil.

1 Claim, 14 Drawing Sheets

MOTOR HAVING CONCENTRATEDLY-WOUND STATOR COIL

CROSS-REFERENCE TO RELATED APPLICATION

This application is a divisional application of U.S. patent application Ser. No. 15/260,741, filed on Sep. 9, 2016, which is based on and claims priority from Japanese Patent Application No. 2015-178772 filed on Sep. 10, 2015. The content of each application listed above is hereby incorporated by reference in its entirety into this application.

BACKGROUND

1 Technical Field

The present invention relates to motors having a stator coil comprised of a plurality of unit coils, each of the unit coils being concentratedly wound around one of a plurality of pole cores in two layers in a height direction of the pole core.

2 Description of Related Art

To achieve both size reduction and output increase of a motor, there is available a method of regularly winding a stator coil of the motor and thereby improving the space factors of the stator coil in inter-pole core spaces (i.e., spaces between circumferentially adjacent pole cores of the stator of the motor). However, in the case of the stator coil being a concentratedly-wound coil, lead portions of the stator coil may become obstacles to the process of regularly winding the stator coil.

To solve the above problem, Japanese Patent Application Publication No. JP2012175741A discloses a concentratedly-wound stator coil. The stator coil includes a plurality of parts each being formed by spirally winding a rectangular wire. The spirally-wound parts are stacked in a plurality of layers. Moreover, those portions of the spirally-wound parts which constitute coil ends of the stator coil are bent into an arc shape. Furthermore, the stator coil also includes a plurality of connecting portions (or layer-changing portions) each connecting one adjacent pair of the spirally-wound parts of the stator coil. The connecting portions are arranged in the inter-pole core spaces and thus not bent into the arc shape.

With the above configuration, it is possible to regularly and concentratedly wind the stator coil. However, at the same time, the space factors of the stator coil in the inter-pole core spaces are lowered due to the arrangement of the connecting portions of the stator coil in the inter-pole core spaces.

SUMMARY

According to exemplary embodiments, there is provided a motor which includes a rotor and a stator that is opposed to the rotor with a radial gap or an axial gap formed therebetween. The stator includes a plurality of pole cores and a stator coil comprised of a plurality of unit coils each of which is concentratedly wound around a corresponding one of the pole cores. Each of the unit coils is comprised of a pair of first and second sub-coils that are stacked in two layers in a stacking direction; the stacking direction coincides with a height direction of the corresponding pole core. Each of the first and second sub-coils is spirally wound so that coil sides of the sub-coil overlap each other in an overlapping direction perpendicular to the stacking direction. Each of the unit coils also has, at a single place, a connecting portion that connects the first and second sub-coils of the unit coil. The connecting portion is provided in a coil end of the unit coil. For each of the first and second sub-coils of the unit coil, the connecting portion is located at an innermost periphery of the sub-coil in the overlapping direction of the sub-coil.

With the above configuration, since the connecting portion is located at the innermost peripheries of the first and second sub-coils, it becomes possible to provide lead portions of the unit coil at the outermost peripheries of the first and second sub-coils. Consequently, it becomes possible for the lead portions to extend without intersecting other coil sides of the first and second sub-coils. As a result, it becomes possible to regularly wind each of the unit coils around the corresponding one of the pole cores.

Moreover, since the connecting portions of the unit coils are provided in the coil ends of the unit coils, the connecting portions cannot become obstacles to the process of regularly winding the unit coils (or the stator coil) in the inter-pole core spaces. Consequently, it becomes possible to maximize the space factors of the unit coils in the inter-pole core spaces, thereby achieving both size reduction and output increase of the motor.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
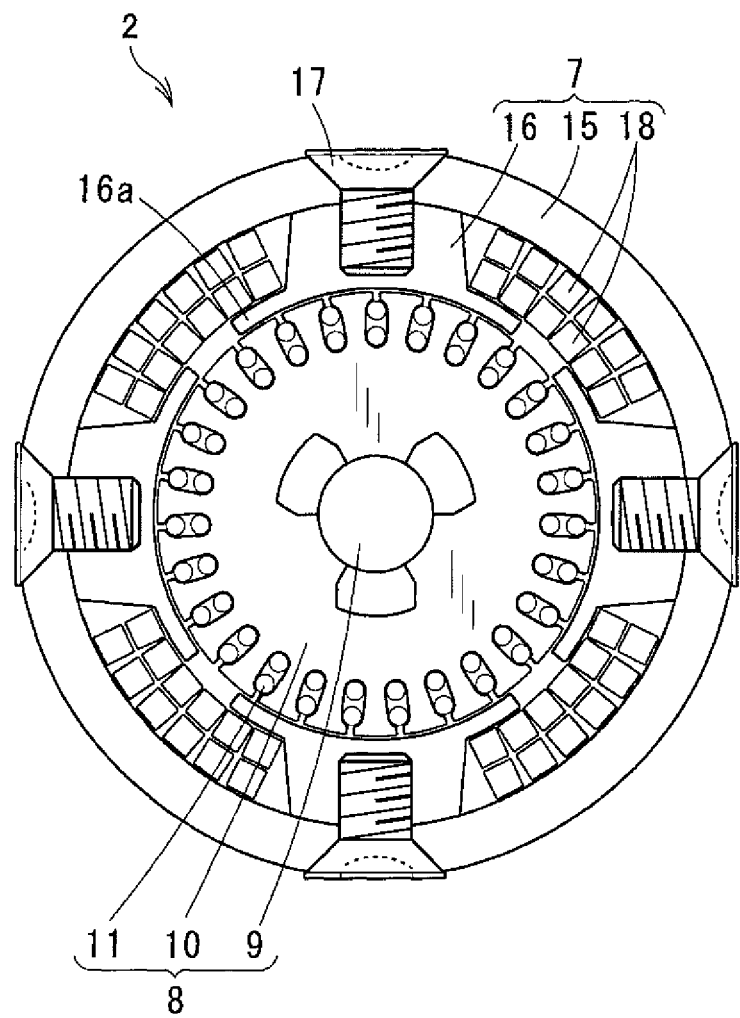
FIG. 1 is a cross-sectional view of a motor according to a first embodiment, which is taken along the line I-I in FIG. 2 and from which hatching lines are omitted for the sake of simplicity.

Exemplary embodiments will be described hereinafter with reference to FIGS. 1-14. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

FIG. 1 shows the overall configuration of a motor 2 according to a first embodiment.

In the present embodiment, the motor 2 is designed to be used in a starter 1 for starting an internal combustion engine of a motor vehicle.

Figure 2:
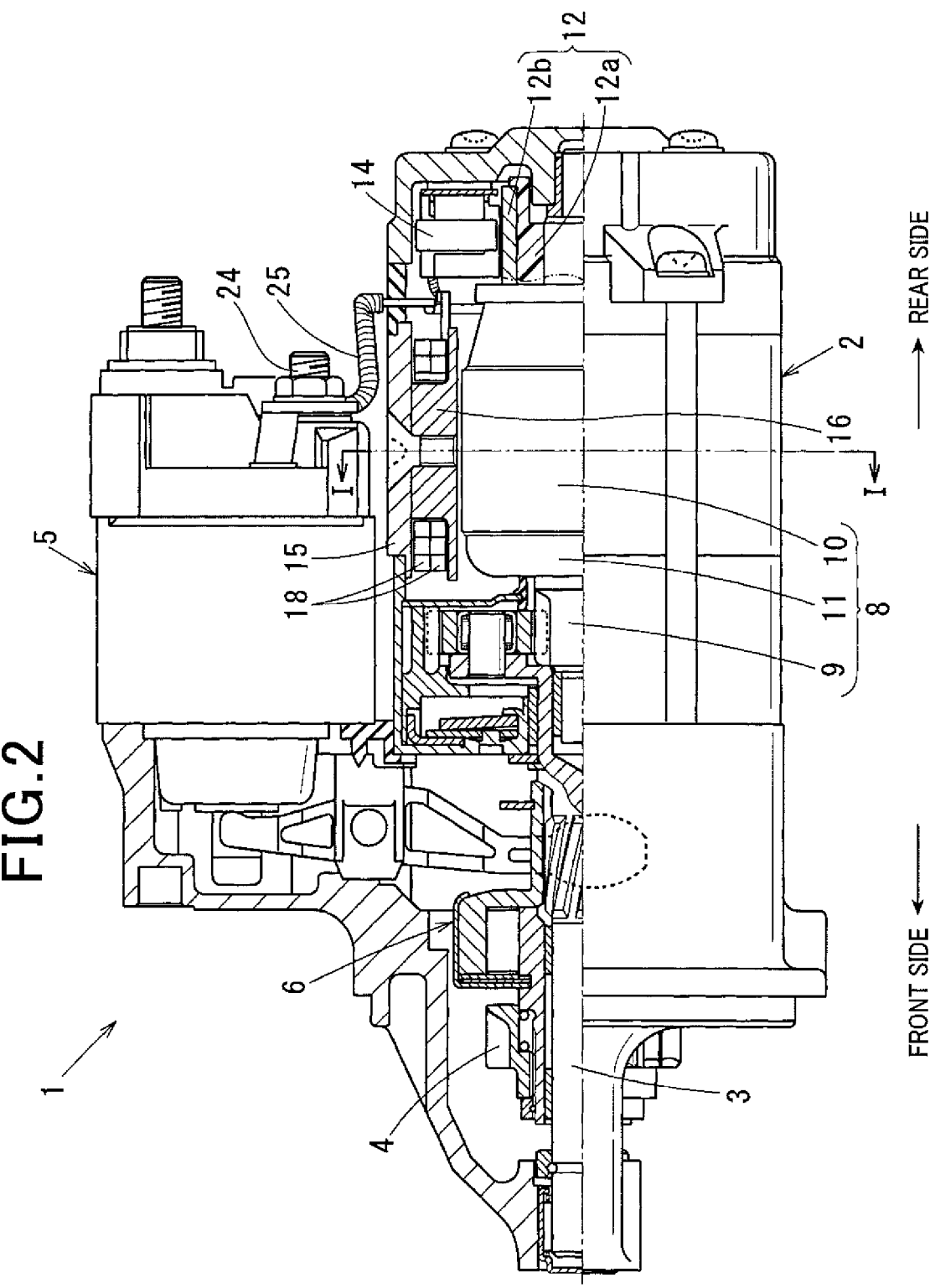
FIG. 2 is a partially cross-sectional view of an engine starter which includes the motor according to the first embodiment.

Referring to FIG. 2, the starter 1 is configured to shift a pinion 4 arranged on an output shaft 3, utilizing an attraction force created by an electromagnetic switch 5, together with a clutch 6 in a direction away from the motor 2 (i.e., the leftward direction in FIG. 2), thereby bringing the pinion 4 into mesh with a ring gear (not shown) of the engine.

The configuration and operation of the starter 1 are similar to those of engine starters well-known in the art. Therefore, a detailed description of the configuration and operation of the starter 1 will be omitted hereinafter.

As shown in FIG. 1, the motor 2 includes a stator 7 that constitutes an electromagnet-type field and a rotor 8 that constitutes an armature. In the present embodiment, the motor 2 is configured as a radial gap-type DC (Direct Current) motor such that the rotor 8 is rotatably disposed radially inside the stator 7 with a radial gap formed therebetween.

The rotor 8 includes an armature shaft (or rotor shaft) 9, an armature core (or rotor core) 10 fixedly fitted on an outer periphery of the armature shaft 9, an armature coil 11 mounted on the armature core 10, and a commutator 12 provided on a rear end portion of the armature shaft 9 (see FIG. 2).

The commutator 12 includes a base member 12a and a plurality of commutator segments 12b. The base member 12a is formed of an electrically-insulative resin material into a hollow cylindrical shape. The base member 12a is fixedly fitted on an outer periphery of the rear end portion of the armature shaft 9. The commutator segments 12b are arranged on a radially outer surface of the base member 12a along a circumferential direction thereof so as to be spaced from one another at equal intervals. Consequently, the commutator segments 12b are electrically insulated from one another by the base member 12a. Moreover, the commutator segments 12b are electrically connected to the armature coil 11 via risers provided on the side of the armature core 10.

On a radially outside of the commutator 12, there are arranged four brushes 13 so as to be circumferentially spaced from one another at equal intervals. The brushes 13 are pressed by respective brush springs 14 against the outer surfaces of the commutator segments 12b. In addition, in the present embodiment, each of the brush springs 14 is implemented by a plate spring as shown in FIG. 2. However, it should be noted that each of the brush springs 14 may be alternatively implemented by a helical spring.

Referring back to FIG. 1, the stator 7 includes a hollow cylindrical yoke 15 for forming a magnetic circuit, a plurality (e.g., four in the present embodiment) of pole cores 16 fixed to a radially inner periphery of the yoke 15, and a stator coil that generates, upon being supplied with electric current, magnetic field and thereby magnetizes the pole cores 16. In addition, the yoke 15 also serves as an outer shell of the motor 2.

The pole cores 16 are arranged in a circumferential direction of the yoke 15 at equal intervals and each extend radially inward from the yoke 15. Each of the pole cores 16 is fixed to the radially inner periphery of the yoke 15 by a screw 17. Hereinafter, for each of the pole cores 16, the radial direction in which the pole core 16 extends inward from the yoke 15 and faces another one of the pole cores 16 will be referred to as the height direction of the pole core 16.

Each of the pole cores 16 has a pair of collar portions 16a formed at a distal end (i.e., the end on the opposite side to the yoke 15 in the height direction of the pole core 16) thereof so as to extend respectively toward opposite sides in the circumferential direction of the yoke 15. Each of the collar portions 16a also extends in the axial direction of the yoke 15 over the entire axial length of the pole core 16. Moreover, each of the collar portions 16a has an arc-shaped cross section perpendicular to the axial direction of the yoke 15 (or the axial direction of the motor 2) and radially faces the armature core 10 with a small radial gap formed therebetween.

The stator coil is comprised of a plurality (e.g., four in the present embodiment) of unit coils 18 each of which is concentratedly and regularly wound around a corresponding one of the pole cores 16.

Figure 3:
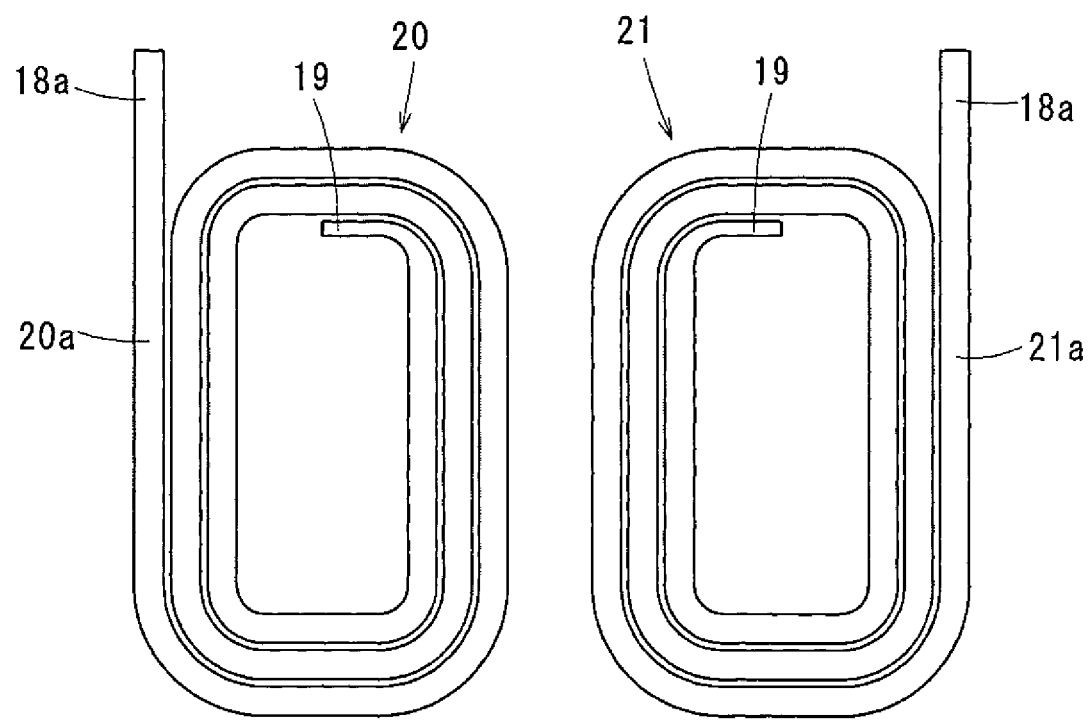
FIG. 3 is a plan view of a pair of first and second sub-coils, the first and second sub-coils together constituting one of four unit coils of a stator coil of the motor according to the first embodiment.
Figure 4:
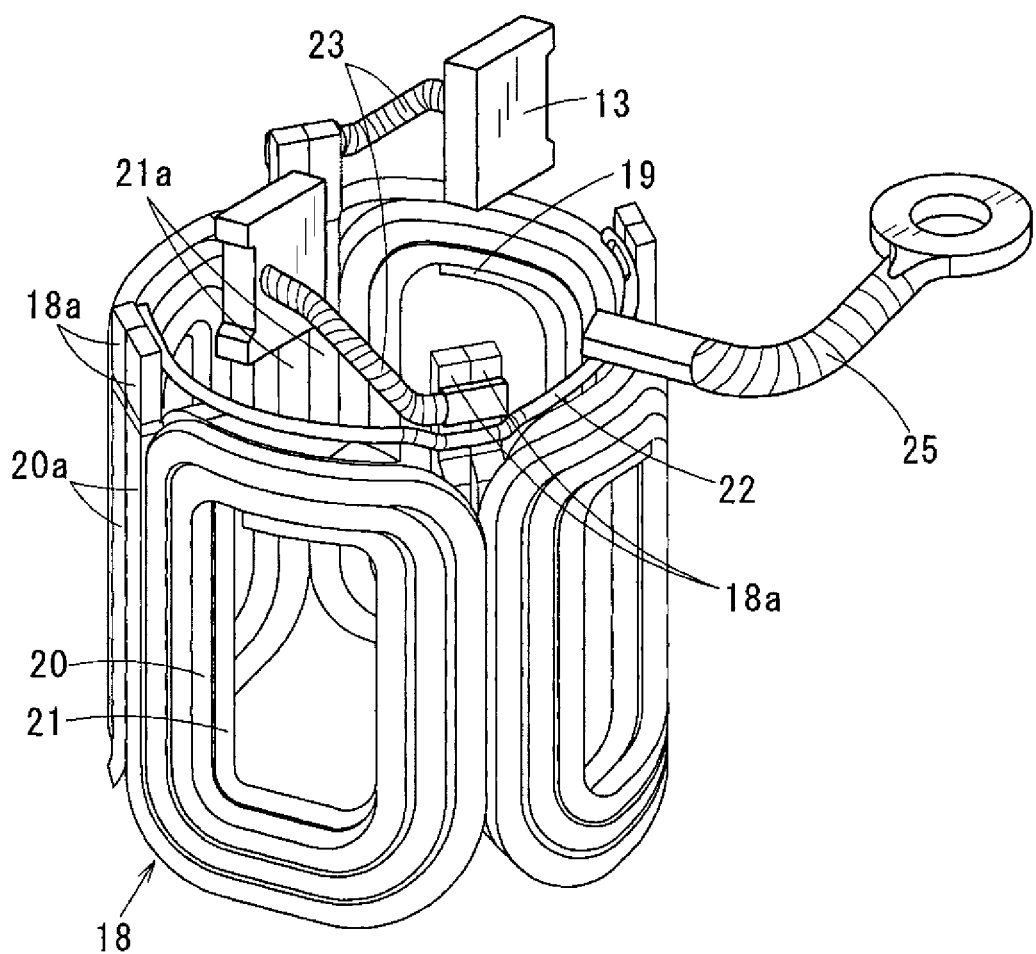
FIG. 4 is a perspective view of a stator coil assembly according to the first embodiment.
Figure 5:
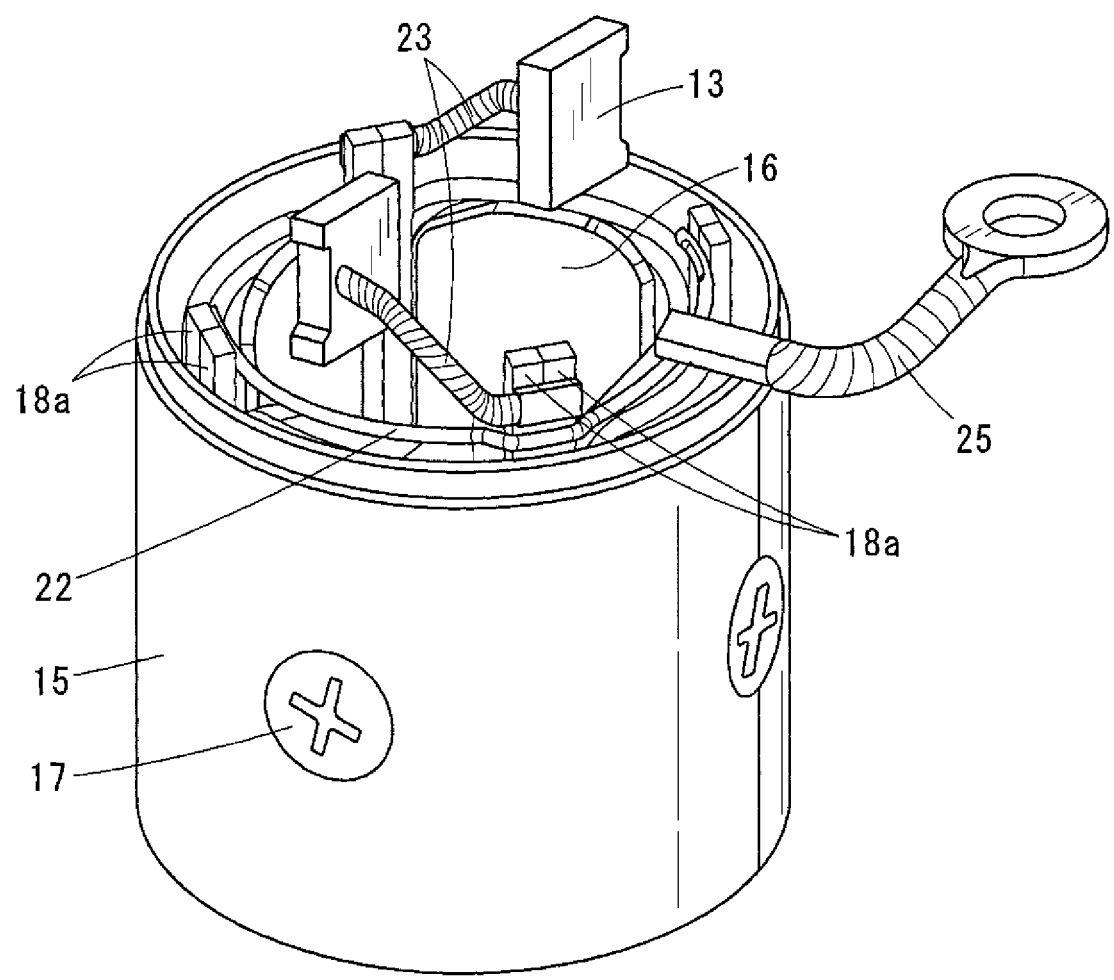
FIG. 5 is a perspective view of a stator assembly according to the first embodiment.

Referring further to FIGS. 3-5 together with FIG. 1, each of the unit coils 18 is comprised of a pair of first and second sub-coils 20 and 21 that are stacked in two layers in the height direction of the corresponding pole core 16. The first sub-coil 20 is located at the first layer (i.e., the layer on the yoke 15 side), while the second sub-coil 21 is located at the second layer (i.e., the layer on the rotor 8 side).

As shown in FIG. 3, each of the first and second sub-coils 20 and 21 is formed by spirally winding an electrically-conductive wire having a substantially square cross-sectional shape around a winding axis, so that coil sides of the sub-coil overlap each other in a direction perpendicular to both the winding axial direction (i.e., a direction perpendicular to the plane of FIG. 3) and the extending direction (or the longitudinal direction) of the sub-coil. Hereinafter, the direction in which coil sides of the sub-coil overlap each other will be referred to as the overlapping direction of the sub-coil.

Moreover, the first and second sub-coils 20 and 21 are stacked so that both the winding axial directions of the first and second sub-coils 20 and 21 coincide with the height direction of the corresponding pole core 16. That is, the stacking direction of the first and second sub-coils 20 and 21 coincides with the height direction of the corresponding pole core 16.

Furthermore, the first and second sub-coils 20 and 21 are connected with each other at a single place by a connecting portion (or layer-changing portion) 19. As shown in FIG. 3, part of the connecting portion 19 is included in the first sub-coil 20, while the remainder of the connecting portion 19 is included in the second sub-coil 21.

In the present embodiment, the connecting portion 19 is provided in one of two coil ends of the unit coil 18 (more particularly, in the rear-side coil end of the unit coil 18). Here, the two coil ends of the unit coil 18 denote those two parts of the unit coil 18 which are located respectively on opposite axial sides of the corresponding pole core 16 and thus outside the inter-pole core spaces (i.e. the spaces between circumferentially adjacent pole cores 16) of the stator 7. Further, for each of the first and second sub-coils 20 and 21, the connecting portion 19 is located at the innermost periphery of the sub-coil in the overlapping direction of the sub-coil.

Furthermore, the connecting portion 19 is plastically deformed, by pressing the wire in the overlapping direction, to have its dimension in the overlapping direction (to be referred to as thickness hereinafter) reduced and its dimension in the stacking direction (to be referred to as width hereinafter) increased. More particularly, in the present embodiment, the thickness of the connecting portion 19 in the overlapping direction is substantially ½ of the thickness of the other portions of the unit coil 18 in the overlapping direction; and the width of the connecting portion 19 in the stacking direction is substantially twice the width of the other portions of the unit coil 18 in the stacking direction.

Moreover, the number of turns of the first sub-coil 20 is set to be equal to the number of turns of the second sub-coil 21. More particularly, in the present embodiment, both the number of turns of the first sub-coil 20 and the number of turns of the second sub-coil 21 are set to 3. Consequently, the number of coil sides of the first sub-coil 20 and the number of coil sides of the second sub-coil 21 received in the same inter-pole core space are equal to each other.

Each of winding finish ends of the first and second sub-coils 20 and 21 is led out, as a terminal portion 18a for electrical connection of the unit coil 18 with the other unit coils 18, to the rear side (i.e., the upper side in FIG. 3). In addition, hereinafter, the outermost coil side of the first sub-coil 20 connected with the terminal portion 18a of the first sub-coil 20 will be referred to as a first lead portion 20a; the outermost coil side of the second sub-coil 21 connected with the terminal portion 18a of the second sub-coil 21 will be referred to as a second lead portion 21a.

Each of the unit coils 18 is wound around the corresponding pole core 16 so that the first and second lead portions 20a and 21a of the unit coil 18 are respectively located on opposite circumferential sides of the corresponding pole core 16.

Moreover, as shown in FIG. 4, each of the unit coils 18 has its first lead portion 20a arranged to circumferentially adjoin the first lead portion 20a of another unit coil 18 and its second lead portion 21a arranged to circumferentially adjoin the second lead portion 21a of yet another unit coil 18. In other words, for each circumferentially-adjacent pair of the unit coils 18, either the first lead portions 20a of the pair of the unit coils 18 or the second lead portions 21a of the pair of the unit coils 18 are arranged to circumferentially adjoin each other.

Furthermore, all of the four unit coils 18 are assembled together to form a stator coil assembly as shown in FIG. 4. In the stator coil assembly, two pairs of circumferentially adjoining terminal portions 18a of the first sub-coils 20 of the unit coils 18 are joined to a connection bar 22; one pair of circumferentially adjoining terminal portions 18a of the second sub-coils 21 of the unit coils 18 is joined to a pigtail 23 of one positive-side brush 13; and another pair of circumferentially adjoining terminal portions 18a of the second sub-coils 21 of the unit coils 18 is joined to a pigtail 23 of another positive-side brush 13.

Further, a motor lead wire 25 is joined to the connection bar 22; the motor lead wire 25 is later to be electrically connected to a motor-side terminal bolt 24 of the electromagnetic switch 5 of the starter 1 (see FIG. 2). Then, the four pole cores 16 are respectively inserted into the four unit coils 18 from the radially inside. Thereafter, the four pole cores 16 are fixed to the radially inner periphery of the yoke 15 respectively by the four screws 17. Consequently, a stator assembly as shown in FIG. 5 is obtained.

According to the present embodiment, it is possible to achieve the following advantageous effects.

In the present embodiment, the motor 2 includes the rotor 8 and the stator 7 that is opposed to the rotor 8 with the radial gap formed therebetween. The stator 7 includes the four pole cores 16 and the stator coil comprised of the four unit coils 18 each of which is concentratedly wound around the corresponding one of the pole cores 16. Each of the unit coils 18 is comprised of the pair of first and second sub-coils 20 and 21 that are stacked in two layers in the stacking direction; the stacking direction coincides with the height direction of the corresponding pole core 16. Each of the first and second sub-coils 20 and 21 is spirally wound so that coil sides of the sub-coil overlap each other in the overlapping direction perpendicular to the stacking direction. Each of the unit coils 18 also has, at a single place, the connecting portion 19 that connects the first and second sub-coils 20 and 21 of the unit coil 18. The connecting portion 19 is provided in the rear-side coil end of the unit coil 18. For each of the first and second sub-coils 20 and 21 of the unit coil 18, the connecting portion 19 is located at the innermost periphery of the sub-coil in the overlapping direction of the sub-coil.

With the above configuration, since the connecting portion 19 is located at the innermost peripheries of the first and second sub-coils 20 and 21, it becomes possible to provide the first and second lead portions 20a and 21a respectively at the outermost peripheries of the first and second sub-coils 20 and 21. Consequently, it becomes possible for the first and second lead portions 20a and 21a to extend without intersecting other coil sides of the first and second sub-coils 20 and 21. As a result, it becomes possible to regularly wind each of the unit coils 18 around the corresponding one of the pole cores 16.

Moreover, since the connecting portions 19 of the unit coils 18 are provided in the rear-side coil ends of the unit coils 18, the connecting portions 19 cannot become obstacles to the process of regularly winding the unit coils 18 (or the stator coil) in the inter-pole core spaces. Consequently, it becomes possible to maximize the space factors of the unit coils 18 in the inter-pole core spaces, thereby achieving both size reduction and output increase of the motor 2.

In the present embodiment, for each of the unit coils 18, the connecting portion 19 of the unit coil 18 has its thickness set to be less than the thickness of other portions of the unit coil 18 in the overlapping direction.

Setting the thickness of the connecting portion 19 as above, it is possible to reduce the axial length of the unit coil 18 and thus the axial length of the entire motor 2, thereby achieving reduction in the size and weight of the motor 2.

Further, in the present embodiment, for each of the unit coils 18, the connecting portion 19 of the unit coil 18 has its thickness set to be substantially ½ of the thickness of the other portions of the unit coil 18 in the overlapping direction and its width set to be substantially twice the width of the other portions of the unit coil 18 in the stacking direction.

Setting the thickness and width of the connecting portion 19 as above, it becomes possible to keep the cross-sectional area of the connecting portion 19 substantially equal to those of the other portions of the unit coil 18. Consequently, it becomes possible to secure high resistance of the unit coil 18 to heat that is generated upon supply of electric current to the unit coil 18.

In the present embodiment, each of the unit coils 18 is configured to have the quadrangular (more particularly, square) cross-sectional shape.

Consequently, compared to the case of configuring each of the unit coils 18 to have a circular cross-sectional shape, it becomes possible to improve the space factors of the unit coils 18 in the inter-pole core spaces.

In the present embodiment, for each circumferentially-adjacent pair of the unit coils 18, either the first lead portions 20a of the pair of the unit coils 18 or the second lead portions 21a of the pair of the unit coils 18 are arranged to adjoin each other in the circumferential direction of the stator 7 (or in the overlapping direction). Moreover, each circumferentially-adjoining pair of the first lead portions 20a or the second lead portions 21a are electrically connected with each other via the corresponding terminal portions 18a of the pair of the unit coils 18.

With the above arrangement of the first and second lead portions 20a and 21a of the unit coils 18, it becomes possible to minimize the electrical connection path between each circumferentially-adjacent pair of the unit coils 18.

In the present embodiment, the motor 2 is used in the starter 1 for starting an internal combustion engine.

In general, a starter motor is operated at low voltage and high electric current. Therefore, the motor 2 according to the present embodiment, which has a small number of turns per pole and high space factors, is particularly suitable for use in the starter 1.

Second Embodiment

Figure 6:
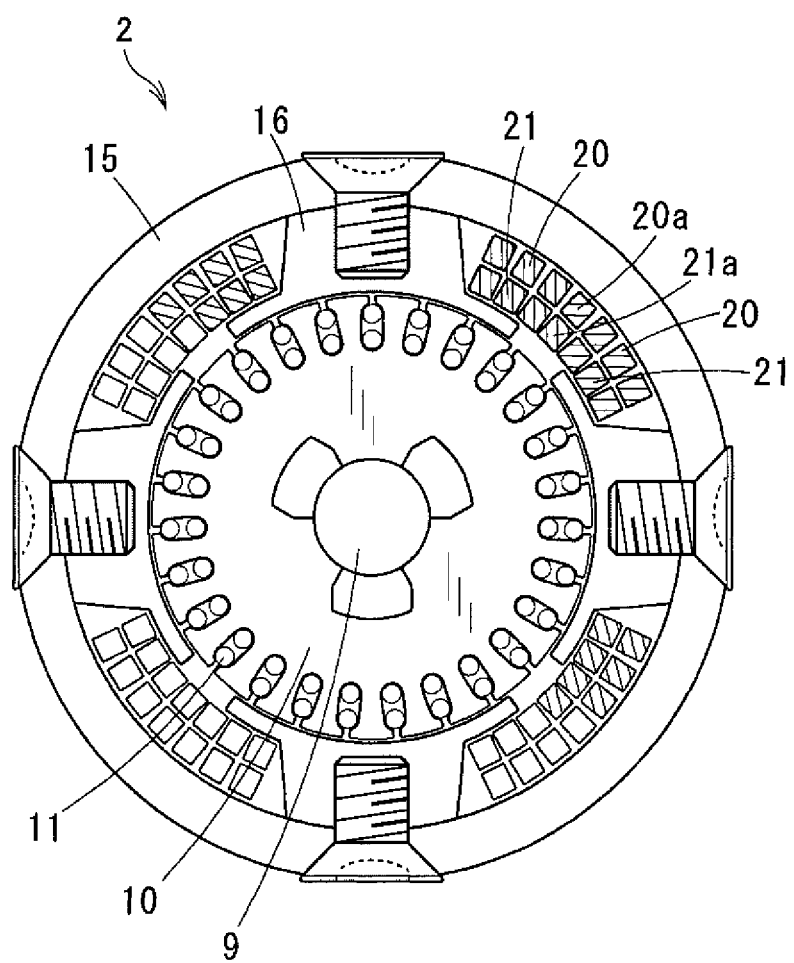
FIG. 6 is a cross-sectional view, taken perpendicular to an axial direction, of a motor according to a second embodiment.

In this embodiment, as shown in FIG. 6, for each circumferentially-adjacent pair of the unit coils 18, both the unit coils 18 of the pair are partially received in a same one of the inter-pole core spaces. In the same inter-pole core space, the number of overlapping coil sides (or the number of turns) of the first sub-coil 20 and the number of overlapping coil sides of the second sub-coil 21 set for one of the two unit coils 18 of the pair are respectively different from those set for the other of the two unit coils 18.

Figure 7:
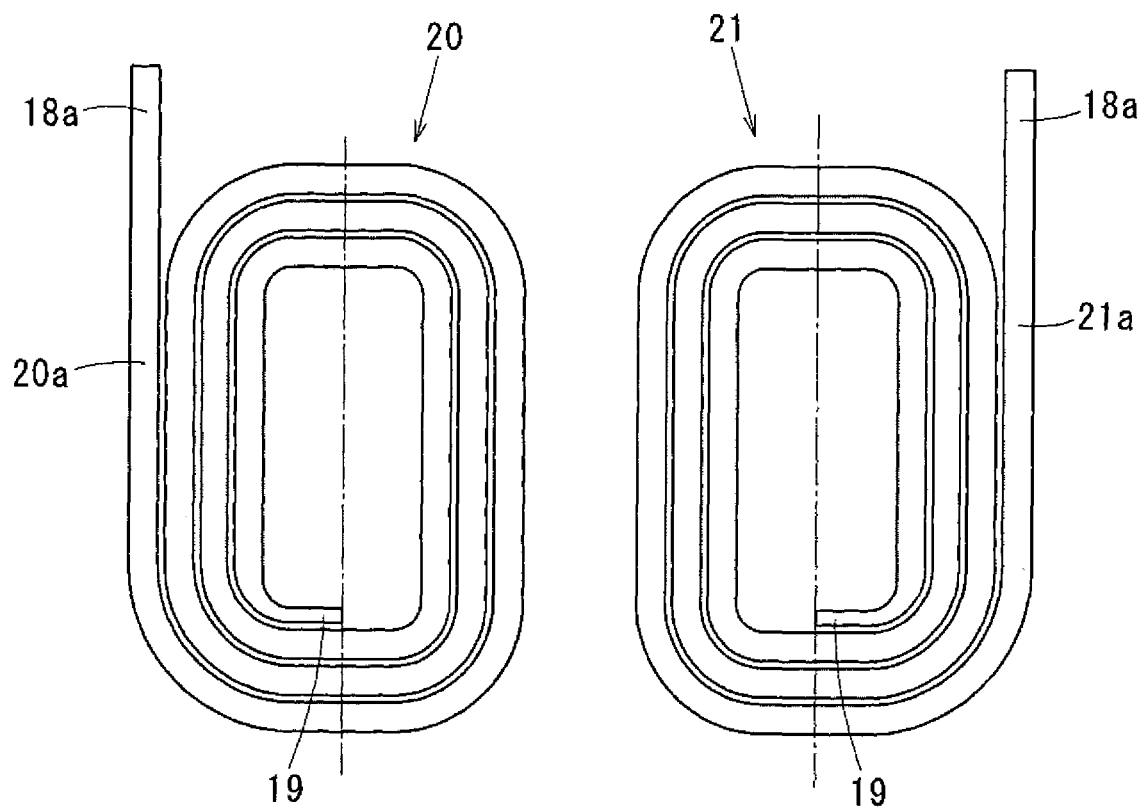
FIG. 7 is a plan view of a pair of first and second sub-coils, the first and second sub-coils together constituting one of four unit coils of a stator coil of the motor according to the second embodiment.

More specifically, in the present embodiment, as shown in FIG. 7, for each of the unit coils 18, the number of overlapping coil sides of the first sub-coil 20 of the unit coil 18 is set to be equal to four on the left side of a centerline of the first sub-coil 20 and equal to three on the right side of the centerline. That is, the number of overlapping coil sides of the first sub-coil 20 on the left side of the centerline of the first sub-coil 20 is set to be greater than that on the right side of the centerline by one. Moreover, the outermost coil side of the first sub-coil 20 on the left side of the centerline constitutes the first lead portion 20a of the unit coil 18. On the other hand, the number of overlapping coil sides of the second sub-coil 21 of the unit coil 18 is set to be equal to three on the left side of a centerline of the second sub-coil 21 and equal to four on the right side of the centerline. That is, the number of overlapping coil sides of the second sub-coil 21 on the left side of the centerline of the second sub-coil 21 is set to be less than that on the right side of the centerline by one. Moreover, the outermost coil side of the second sub-coil 21 on the right side of the centerline constitutes the second lead portion 21a of the unit coil 18. In addition, in FIG. 7, the centerlines of the first and second sub-coils 20 and 21 are shown with one-dot chain lines.

With the above configuration of the unit coils 18, referring back to FIG. 6, for each circumferentially-adjacent pair of the unit coils 18, in the inter-pole core space where both the unit coils 18 of the pair are partially received, one of the two unit coils 18 of the pair has the number of overlapping coil sides of the first sub-coil 20 set to be greater than the number of overlapping coil sides of the second sub-coil 21 by one; and the other one of the two unit coils 18 of the pair has the number of overlapping coil sides of the second sub-coil 21 set to be greater than the number of overlapping coil sides of the first sub-coil 20 by one.

Moreover, in the present embodiment, as shown in FIG. 6, for each circumferentially-adjacent pair of the unit coils 18, the first lead portion 20a of one of the two unit coils 18 of the pair and the second lead portion 21a of the other of the two unit coils 18 of the pair are arranged to radially overlap each other (or arranged at the same circumferential position).

With the above arrangement of the first and second lead portions 20a and 21a of the unit coils 18, it becomes possible to regularly wind the unit coils 18, which have the configuration as shown in FIG. 7, in the inter-pole core spaces without leaving unnecessary gaps therein. Consequently, it becomes possible to secure high space factors of the unit coils 18 in the inter-pole core spaces, thereby achieving both size reduction and output increase of the motor 2.

Third Embodiment

This embodiment illustrates a method of electrically connecting the first and second lead portions 20a and 21a of each circumferentially-adjacent pair of the unit coils 18 described in the second embodiment.

As described previously, in the first embodiment, for each circumferentially-adjacent pair of the unit coils 18, either the first lead portions 20a of the pair of the unit coils 18 or the second lead portions 21a of the pair of the unit coils 18 are arranged to circumferentially adjoin each other (see FIG. 4). In comparison, in the second embodiment, for each circumferentially-adjacent pair of the unit coils 18, the first lead portion 20a of one of the two unit coils 18 of the pair and the second lead portion 21a of the other of the two unit coils 18 of the pair are arranged to radially overlap each other (see FIG. 6).

In the present embodiment, the first and second lead portions 20a and 21a of each circumferentially-adjacent pair of the unit coils 18 described in the second embodiment are electrically connected as follows.

Figure 8:
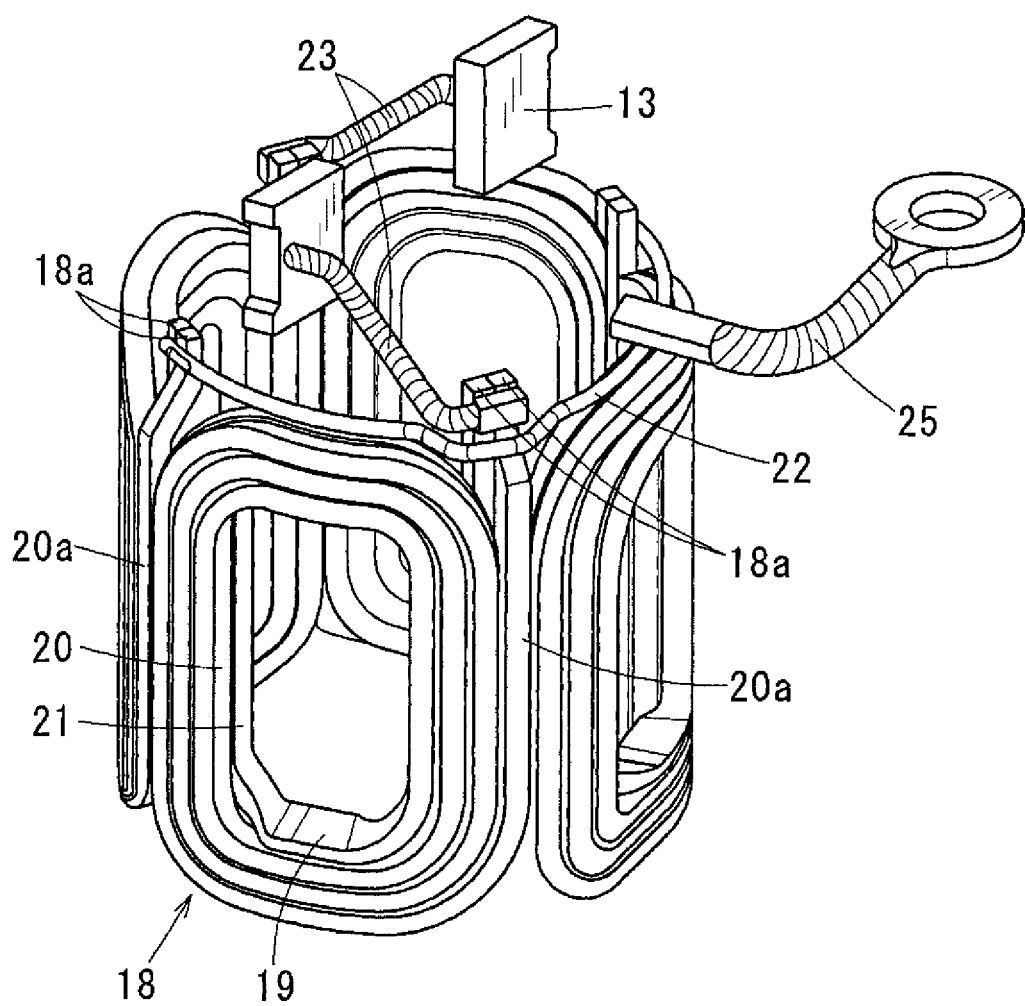
FIG. 8 is a perspective view of a stator coil assembly according to a third embodiment.

As shown in FIG. 8, for each circumferentially-adjacent pair of the unit coils 18, the terminal portion 18a of the first sub-coil 20 of one of the two unit coils 18 of the pair is bent, against the first lead portion 20a of the one of the two unit coils 18, radially inward and arranged to circumferentially adjoin the terminal portion 18a of the second sub-coil 21 of the other of the two unit coils 18. Consequently, there are a total of four pairs of circumferentially adjoining terminal portions 18a of the unit coils 18. Among them, two pairs of circumferentially adjoining terminal portions 18a of the unit coils 18 are joined to a connection bar 22; one pair of circumferentially adjoining terminal portions 18a of the unit coils 18 is joined to a pigtail 23 of one positive-side brush 13; and the remaining one pair of circumferentially adjoining terminal portions 18a of the unit coils 18 is joined to a pigtail 23 of another positive-side brush 13. Further, a motor lead wire 25 is joined to the connection bar 22; the motor lead wire 25 is later to be electrically connected to the motor-side terminal bolt 24 of the electromagnetic switch 5 of the starter 1 (see FIG. 2).

With the above method, it becomes possible to minimize the electrical connection path between each circumferentially-adjacent pair of the unit coils 18 described in the second embodiment.

In an alternative method, for each circumferentially-adjacent pair of the unit coils 18, the terminal portion 18a of the first sub-coil 20 of one of the two unit coils 18 of the pair may be led out straight, without being bent radially inward, from the first lead portion 20a of the one of the two unit coils 18 and arranged to radially adjoin the terminal portion 18a of the second sub-coil 21 of the other of the two unit coils 18.

Fourth Embodiment

In this embodiment, each of the first and second lead portions 20a and 21a of the unit coils 18 is reduced in the thickness in the overlapping direction and increased in the width in the stacking direction.

Figure 10:
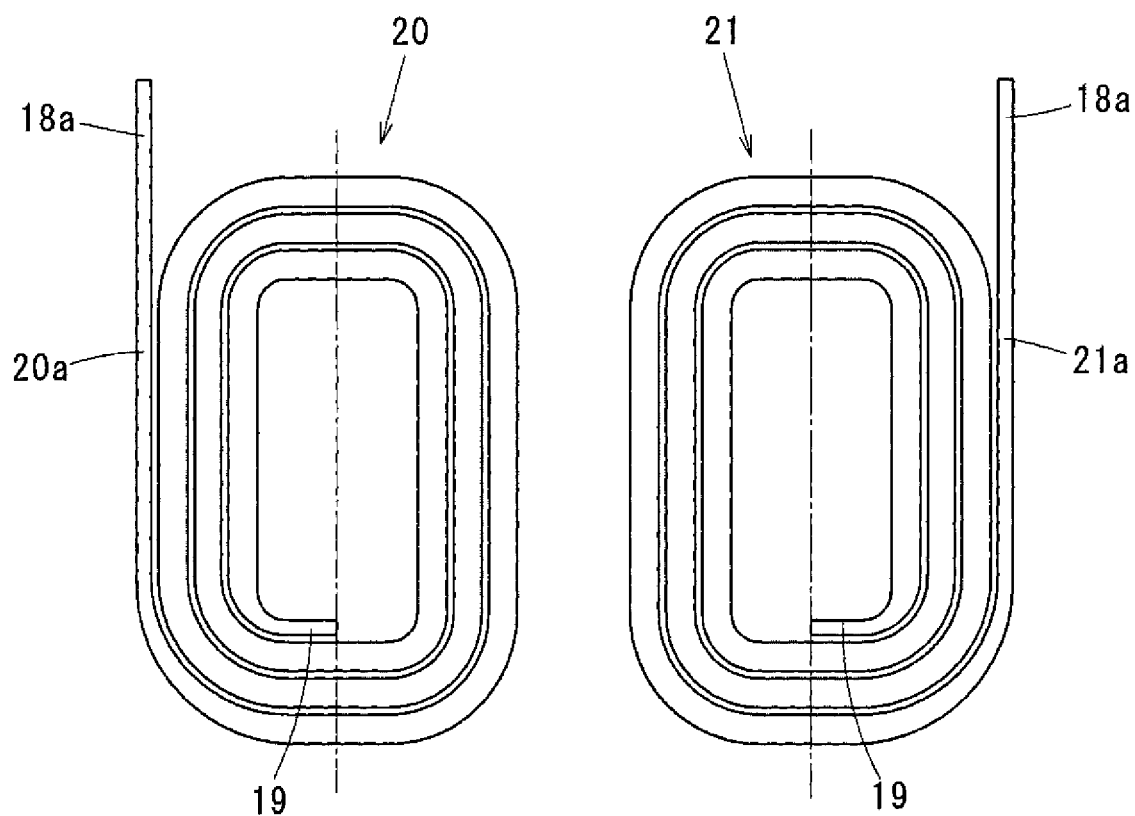
FIG. 10 is a plan view of a pair of first and second sub-coils, the first and second sub-coils together constituting one of four unit coils of a stator coil of the motor according to the fourth embodiment.

Specifically, in the present embodiment, as shown in FIG. 10, for each of the unit coils 18, the number of overlapping coil sides (or the number of turns) of the first sub-coil 20 of the unit coil 18 is set to be equal to four on the left side of a centerline of the first sub-coil 20 and equal to three on the right side of the centerline. That is, the number of overlapping coil sides of the first sub-coil 20 on the left side of the centerline of the first sub-coil 20 is set to be greater than that on the right side of the centerline by one. Moreover, the outermost coil side of the first sub-coil 20 on the left side of the centerline constitutes the first lead portion 20a of the unit coil 18. On the other hand, the number of overlapping coil sides of the second sub-coil 21 of the unit coil 18 is set to be equal to three on the left side of a centerline of the second sub-coil 21 and equal to four on the right side of the centerline. That is, the number of overlapping coil sides of the second sub-coil 21 on the left side of the centerline of the second sub-coil 21 is set to be less than that on the right side of the centerline by one. Moreover, the outermost coil side of the second sub-coil 21 on the right side of the centerline constitutes the second lead portion 21a of the unit coil 18. In addition, in FIG. 10, the centerlines of the first and second sub-coils 20 and 21 are shown with one-dot chain lines.

Moreover, in the present embodiment, each of the first and second lead portions 20a and 21a of the unit coils 18 is plastically deformed, by pressing the wire in the overlapping direction, to have its thickness in the overlapping direction reduced and its width in the stacking direction increased.

Figure 9:
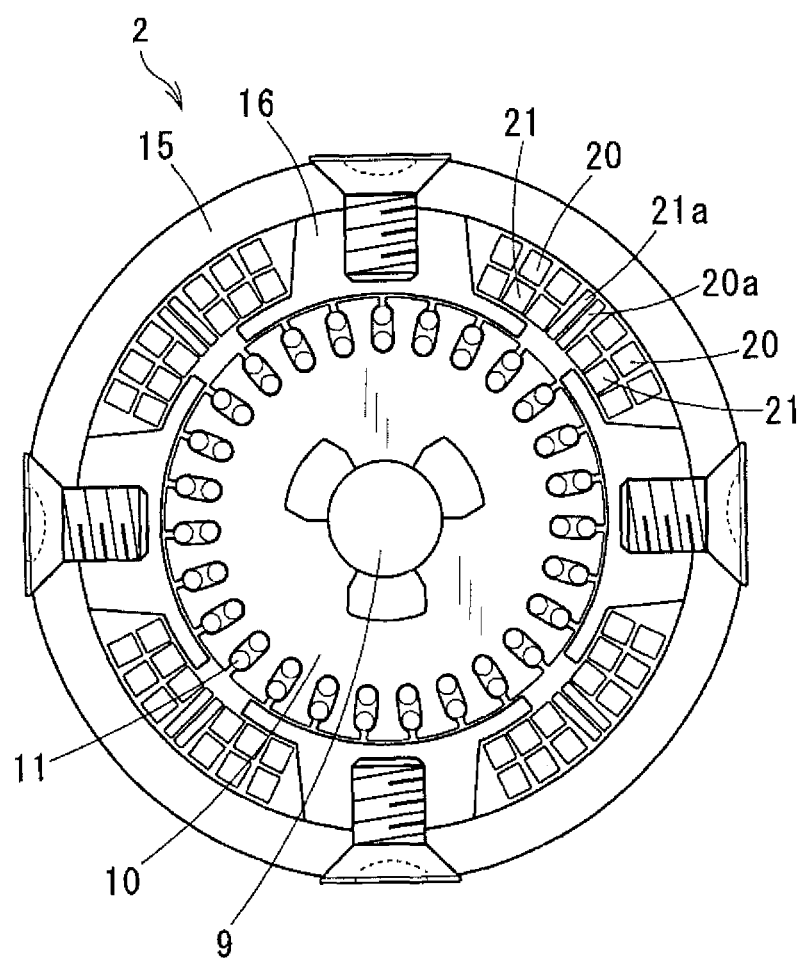
FIG. 9 is a cross-sectional view, taken perpendicular to an axial direction, of a motor according to a fourth embodiment.

More particularly, in the present embodiment, as shown in FIG. 9, the thickness of the first and second lead portions 20a and 21a in the overlapping direction is ½ of the thickness of the other coil sides of the unit coils 18 in the overlapping direction; and the width of the first and second lead portions 20a and 21a in the stacking direction is twice the width of the other coil sides of the unit coils 18 in the stacking direction.

Furthermore, in the present embodiment, each of the first and second lead portions 20a and 21a of the unit coils 18 is arranged over both the first and second layers of the unit coils 18 in the stacking direction. Moreover, each of the first lead portions 20a of the unit coils 18 is arranged to circumferentially adjoin a corresponding one of the second lead portions 21a of the unit coils 18.

Moreover, in the present embodiment, as shown in FIG. 9, each of the unit coils 18 has the number of overlapping coil sides of the first sub-coil 20 set to be greater than the number of overlapping coil sides of the second sub-coil 21 by one in one of the two inter-pole core spaces between which the corresponding pole core 16 is interposed and the number of overlapping coil sides of the second sub-coil 21 set to be greater than the number of overlapping coil sides of the first sub-coil 20 by one in the other of the two inter-pole core spaces.

Figure 11:
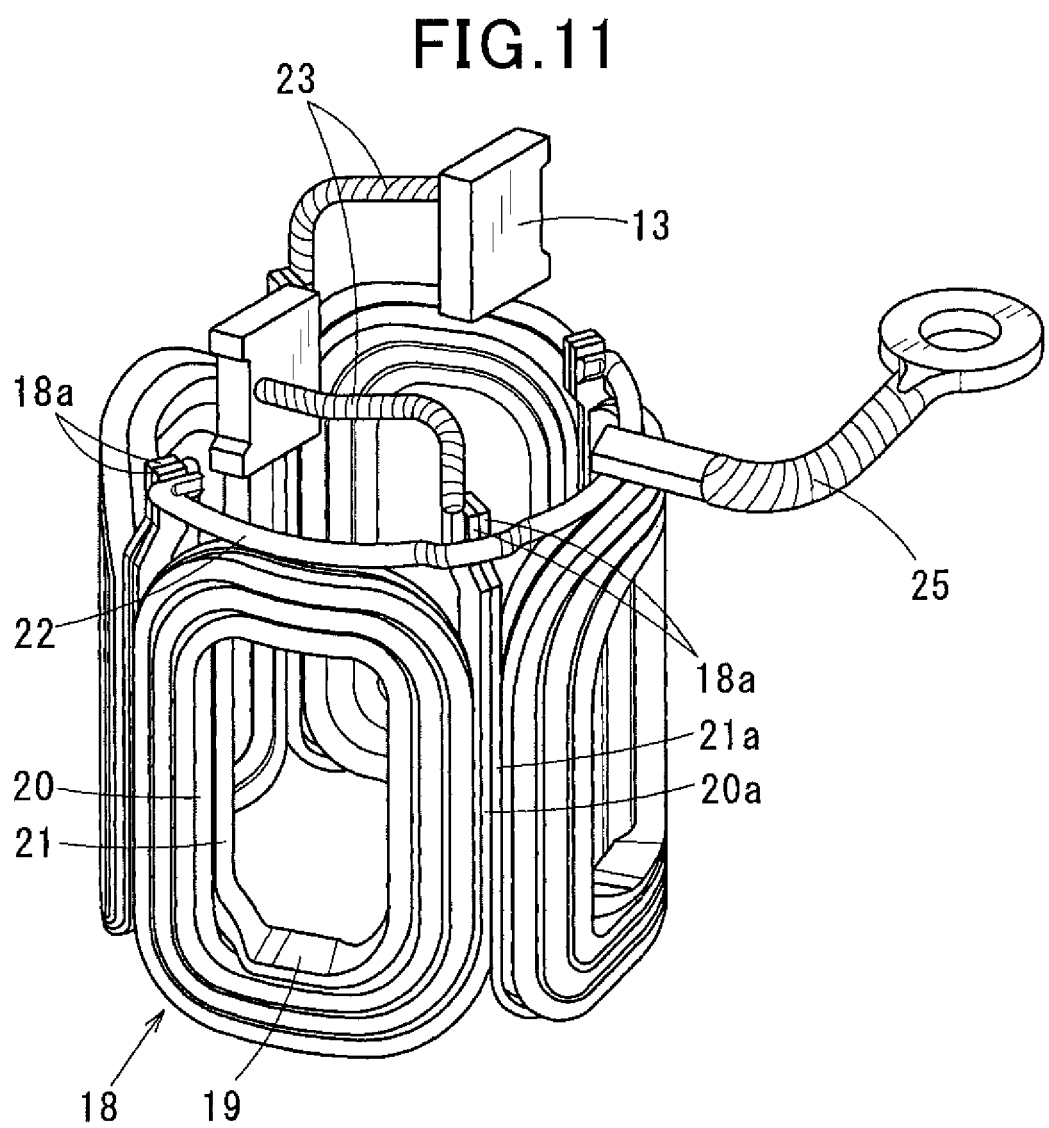
FIG. 11 is a perspective view of a stator coil assembly according to the fourth embodiment.

In the present embodiment, as shown in FIG. 11, for each circumferentially-adjoining pair of the first and second lead portions 20a and 21a of the unit coils 18, the pair of the terminal portions 18a of the unit coils 18 respectively connected with the pair of the first and second lead portions 20a and 21a are also arranged to circumferentially adjoin each other. Consequently, there are a total of four pairs of circumferentially adjoining terminal portions 18a of the unit coils 18. Among them, two pairs of circumferentially adjoining terminal portions 18a of the unit coils 18 are joined to a connection bar 22; one pair of circumferentially adjoining terminal portions 18a of the unit coils 18 is joined to a pigtail 23 of one positive-side brush 13; and the remaining one pair of circumferentially adjoining terminal portions 18a of the unit coils 18 is joined to a pigtail 23 of another positive-side brush 13. Further, a motor lead wire 25 is joined to the connection bar 22; the motor lead wire 25 is later to be electrically connected to the motor-side terminal bolt 24 of the electromagnetic switch 5 of the starter 1 (see FIG. 2).

With the above arrangement of the first and second lead portions 20a and 21a of the unit coils 18 according to the present embodiment, it becomes possible to regularly wind the unit coils 18, which have the configuration as shown in FIG. 10, in the inter-pole core spaces without leaving unnecessary gaps therein. Consequently, it becomes possible to secure high space factors of the unit coils 18 in the inter-pole core spaces, thereby achieving both size reduction and output increase of the motor 2.

Fifth Embodiment

Figure 12:
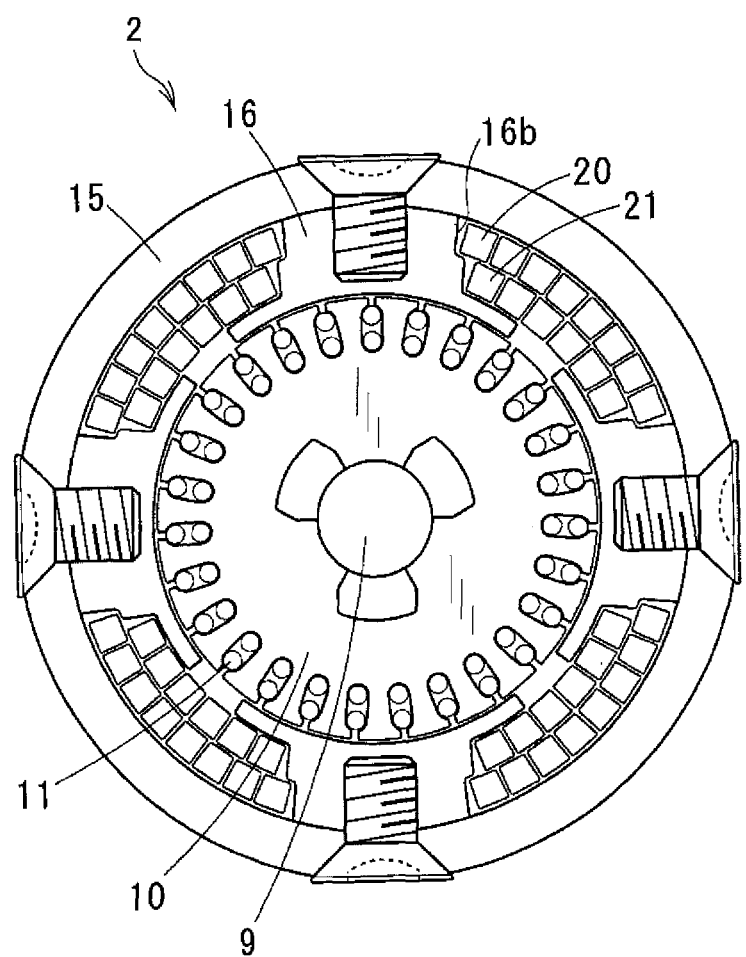
FIG. 12 is a cross-sectional view, taken perpendicular to an axial direction, of a motor according to a fifth embodiment.

In this embodiment, as shown in FIG. 12, each of the pole cores 16 has an opposite pair of circumferential side surfaces; each of the circumferential side surfaces is stepped in the height direction of the pole core 16 at a position corresponding to the boundary between the first and second sub-coils 20 and 21 of the corresponding unit coil 18 in the stacking direction. Consequently, a recess 16b is formed in the circumferential side surface so as to be circumferentially recessed toward the center of the pole core 16. The recess 16b is positioned in the height direction of the pole core 16 on the side of the first sub-coil 20 of the corresponding unit coil 18.

Moreover, as shown in FIG. 12, for each of the unit coils 18, the number of turns of the first sub-coil 20 of the unit coil 18 is set to be greater than the number of turns of the second sub-coil 21 of the unit coil 18. More particularly, in the present embodiment, the number of turns of the first sub-coil 20 is set to four, while the number of turns of the second sub-coil 21 is set to three.

Furthermore, in the present embodiment, as shown in FIG. 12, in each of the recesses 16b formed in the circumferential side surfaces of the pole cores 16, there is received at least part of an innermost coil side of the first sub-coil 20 of the corresponding unit coil 18.

With the above arrangement, it becomes possible to absorb the difference in the number of turns (or the difference in outer diameter) between the first and second sub-coils 20 and 21 of the unit coils 18 by the stepped shape of the circumferential side surfaces of the pole cores 16. Thus, no step is formed in the stacking direction between the outermost coil sides of the first and second sub-coils 20 and 21. Consequently, it becomes possible to regularly wind the unit coils 18 in the inter-pole core spaces without leaving unnecessary gaps therein. As a result, it becomes possible to secure high space factors of the unit coils 18 in the inter-pole core spaces, thereby achieving both size reduction and output increase of the motor 2.

Sixth Embodiment

Figure 13:
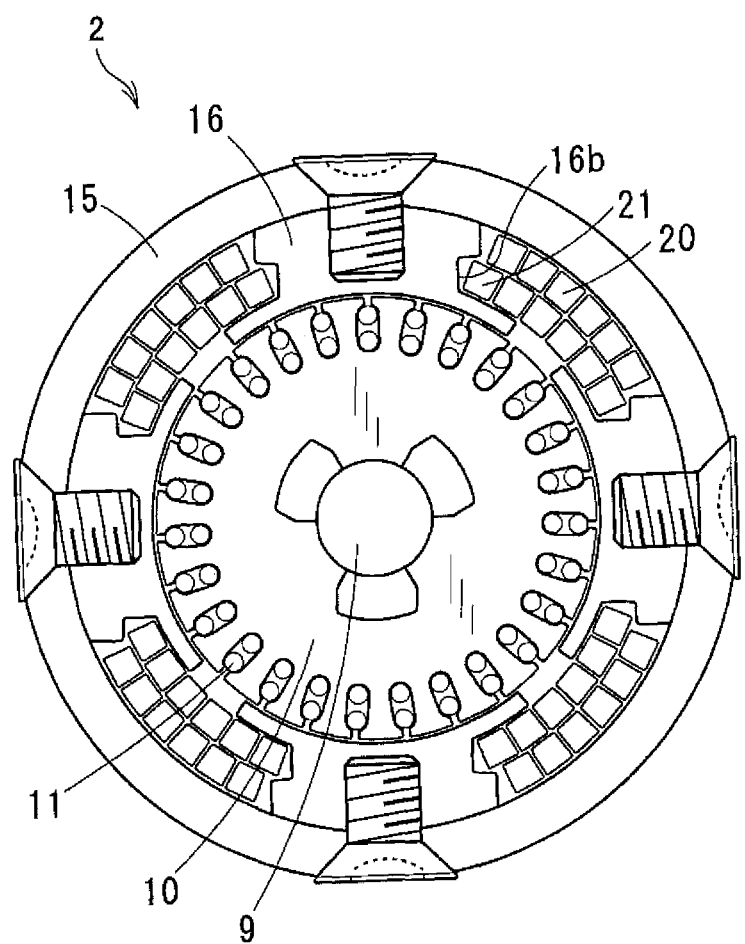
FIG. 13 is a cross-sectional view, taken perpendicular to an axial direction, of a motor according to a sixth embodiment.

In this embodiment, as shown in FIG. 13, each of the pole cores 16 has an opposite pair of circumferential side surfaces; each of the circumferential side surfaces is stepped in the height direction of the pole core 16 at a position corresponding to the boundary between the first and second sub-coils 20 and 21 of the corresponding unit coil 18 in the stacking direction. Consequently, a recess 16b is formed in the circumferential side surface so as to be circumferentially recessed toward the center of the pole core 16. The recess 16b is radially positioned on the side of the second sub-coil 21 of the corresponding unit coil 18 (or on the radially inner side).

Moreover, as shown in FIG. 13, for each of the unit coils 18, the number of turns of the first sub-coil 20 of the unit coil 18 is set to be equal to the number of turns of the second sub-coil 21 of the unit coil 18.

Furthermore, in the present embodiment, as shown in FIG. 13, in each of the recesses 16b formed in the circumferential side surfaces of the pole cores 16, there is received at least part of an innermost coil side of the second sub-coil 21 of the corresponding unit coil 18.

In the stator 7 of the radial gap-type motor 2, when the number of turns of the first sub-coil 20 is set to be equal to the number of turns of the second sub-coil 21 as in the present embodiment, the annular range of the second sub-coil 21 located on the radially inner side is wider than the angular range of the first sub-coil 20 located on the radially outer side.

However, with the above configuration of the stator 7 according to the present embodiment, it becomes possible to absorb the difference in angular range between the first and second sub-coils 20 and 21 of the unit coil 18 by the stepped shape of the circumferential side surfaces of the pole cores 16. Consequently, it becomes possible to regularly wind the unit coils 18 in the inter-pole core spaces without leaving unnecessary gaps therein. As a result, it becomes possible to secure high space factors of the unit coils 18 in the inter-pole core spaces, thereby achieving both size reduction and output increase of the motor 2.

Seventh Embodiment

Figure 14:
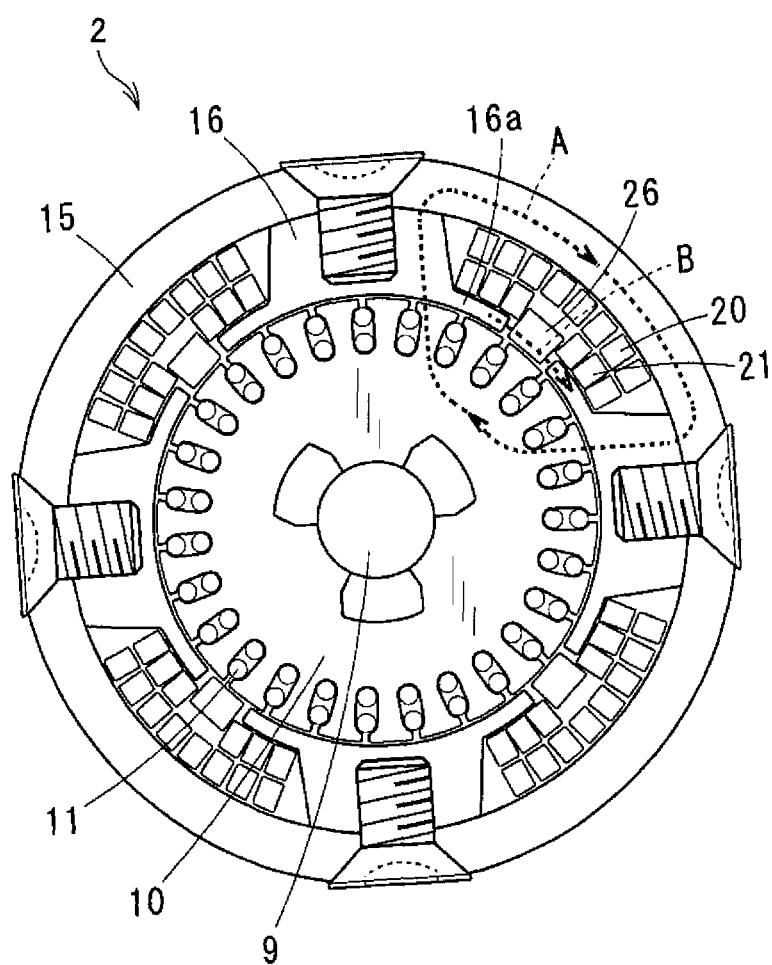
FIG. 14 is a cross-sectional view, taken perpendicular to an axial direction, of a motor according to a seventh embodiment.

In the present embodiment, as shown in FIG. 14, for each of the unit coils 18, the number of turns of the first sub-coil 20 of the unit coil 18 is set to be greater than the number of turns of the second sub-coil 21 of the unit coil 18. More specifically, the number of turns of the first sub-coil 20 is set to four, while the number of turns of the second sub-coil 21 is set to three.

Moreover, each circumferentially-adjacent pair of the unit coils 18 are arranged with an inter-coil gap formed between outermost coil sides of the second sub-coils 21 of the pair of the unit coils 18. In addition, between each circumferentially-facing pair of the collar portions 16a of the pole cores 16, there is formed an inter-collar portion gap.

The stator 7 further includes a plurality (e.g., four in the present embodiment) of magnets 26 each of which is arranged in both a corresponding one of the inter-collar portion gaps and a corresponding one of the inter-coil gaps. That is, between each circumferentially-adjacent pair of the pole cores 16, there is arranged a corresponding one of the magnets 26.

Moreover, each of the magnets 26 is configured (or magnetized) to generate magnetic flux in an opposite direction to magnetic flux that is generated by the corresponding unit coils 18 and flows between the corresponding pair of the collar portions 16a of the pole cores 16 through the corresponding inter-collar portion gap formed therebetween. In addition, in FIG. 14, the direction of the magnetic flux generated by one of the magnets 26 is indicated by an arrowed dashed-line B; and the direction of the magnetic flux generated by the corresponding unit coils 18 is indicated by an arrowed dashed-line A.

With the above configuration, it becomes possible to reduce leakage magnetic flux between each circumferentially-facing pair of the collar portions 16a of the pole cores 16. That is, it becomes possible to effectively utilize the inter-coil gaps formed between circumferentially adjacent unit coils 18. Consequently, it becomes possible to achieve both size reduction and output increase of the motor 2.

While the above particular embodiments have been shown and described, it will be understood by those skilled in the art that the present invention can also be embodied in various other modes without departing from the spirit of the present invention.

For example, in the first embodiment, each of the first and second sub-coils 20 and 21 of the unit coils 18 is formed by winding an electrically-conductive wire that has a substantially square cross section.

However, each of the first and second sub-coils 20 and 21 of the unit coils 18 may also be formed by edge-wise-winding an electrically-conductive wire that has a substantially rectangular cross section. Here, the term edge-wise-winding denotes the manner of winding the electrically-conductive wire with the longer sides of the rectangular cross section of the wire parallel to the overlapping direction and the shorter sides of the rectangular cross section parallel to the stacking direction. In this case, it is possible to form each of the first and second sub-coils 20 and 21 of the unit coils 18 to have a smaller number of turns in comparison with the first embodiment. Accordingly, it is also possible to reduce the number of insulating coats or insulating members used for electrically insulating the overlapping coil sides of the first and second sub-coils 20 and 21 of the unit coils 18 from each other. Consequently, it is possible to further improve the space factors of the unit coils 18 in the inter-pole core spaces.

Alternatively, each of the first and second sub-coils 20 and 21 of the unit coils 18 may also be formed by winding an electrically-conductive wire having a substantially trapezoidal cross section that has a greater width on the radially outer side than on the radially inner side. In this case, it is possible to reduce unnecessary gaps between coil sides adjacent to each other in the overlapping direction, thereby further improving the space factors of the unit coils 18 in the inter-pole core spaces.

In the first to the seventh embodiments, each of the pole cores 16 has only one unit coil 18 wound therearound.

However, each of the pole cores 16 may also have two or more unit coils 18 wound therearound; the two or more unit coils 18 are arranged in the height direction of the pole core 16. In this case, each circumferentially-adjacent pair of the unit coils 18 are located at the same position in the height directions of the corresponding pole cores 16. Moreover, among all of the unit coils 18, those unit coils 18 which are located closest to the rotor 8 may have the same configuration and arrangement as the unit coils 18 in the seventh embodiment.

The first to the seventh embodiments are directed to the radial gap-type motor 2 where the rotor 8 is rotatably disposed radially inside the stator 7 with the radial gap formed therebetween.

However, the first to the seventh embodiments can also be applied to an outer rotor-type motor where a rotor is rotatably disposed radially outside a stator with a radial gap formed between. Moreover, the first to the fifth and the seventh embodiments can also be applied to an axial gap-type motor where a stator and a rotor are opposed to each other with an axial gap formed therebetween.

What is claimed is:

1. A motor comprising:
   a rotor; and
   a stator opposed to the rotor with a radial gap or an axial gap formed therebetween, the stator including a plurality of pole cores and a stator coil comprised of a plurality of unit coils each of which is concentratedly wound around a corresponding one of the pole cores,
   wherein
   each of the unit coils is comprised of a pair of first and second sub-coils that are stacked in two layers in a stacking direction, the stacking direction coinciding with a height direction of the corresponding pole core,
   each of the first and second sub-coils is spirally wound so that coil sides of the sub-coil overlap each other in an overlapping direction perpendicular to the stacking direction,
   each of the unit coils also has, at a single place, a connecting portion that connects the first and second sub-coils of the unit coil,
   the connecting portion is provided in a coil end of the unit coil, and
   for each of the first and second sub-coils of the unit coil, the connecting portion is located at an innermost periphery of the sub-coil in the overlapping direction of the sub-coil,
   for each of the unit coils, the number of turns of the first sub-coil of the unit coil is set to be greater than the number of turns of the second sub-coil of the unit coil,
   each of the pole cores has an opposite pair of circumferential side surfaces, each of the circumferential side surfaces being stepped at a position in the height direction of the pole core to have a recess formed therein, the position corresponding to a boundary between the first and second sub-coils of the corresponding unit coil in the stacking direction, the recess being circumferentially recessed toward a center of the pole core and positioned in the height direction of the pole core on the side of the first sub-coil of the corresponding unit coil, and
   in the recess, there is received at least part of an innermost coil side of the first sub-coil of the corresponding unit coil.

* * * * *